United States Patent [19]
Jouenne et al.

[11] Patent Number: 6,009,426
[45] Date of Patent: Dec. 28, 1999

[54] METHOD OF MANAGING A SHARED MEMORY USING READ AND WRITE LOCKS

[75] Inventors: Franck Jouenne, LePlessis Trevise; Dominique Guidot, Sevres; Benoît Paul-Dubois Taine, Bourg la Reine, all of France

[73] Assignee: Alcatel, Paris, France

[21] Appl. No.: 08/844,635

[22] Filed: Apr. 21, 1997

[30] Foreign Application Priority Data

Apr. 17, 1997 [FR] France .................................. 97 04744

[51] Int. Cl.⁶ .............................. G06F 12/00; G06F 17/30
[52] U.S. Cl. .............................. 707/8; 711/147; 711/150; 711/151; 711/163; 707/103
[58] Field of Search ..................... 711/147, 163, 711/152, 150, 151, 162; 707/8, 103

[56] References Cited

U.S. PATENT DOCUMENTS

| | | | |
|---|---|---|---|
| 5,287,521 | 2/1994 | Nitta et al. | 395/725 |
| 5,721,943 | 2/1998 | Johnson | 707/8 |
| 5,761,659 | 2/1996 | Bertoni | 707/8 |
| 5,832,484 | 6/1996 | Sankaran et al. | 707/8 |

OTHER PUBLICATIONS

"An Introduction to Database Systems", Jul. 1985, Addision-Wesley Publishing Company, Reading, MA, US XP002051552, pp. 83–142.

J. N. Gray et al, "Granularity of locks and degrees of consistency in a shared data base", Proceedings of the IFIP Working Conference on Modelling in Data Base Management Systems, Freudenstatdt, West Germany, Jan. 5–8, 1976, ISBN 0-7204-0459-2, 1976, Amsterdam, Netherlands, North Holland, Netherlands, pp. 365–394 XP002051551.

*Primary Examiner*—Eddie P. Chan
*Assistant Examiner*—Kimberly Nicole McLean
*Attorney, Agent, or Firm*—Sughrue, Mion, Zinn, Macpeak & Seas, PLLC

[57] ABSTRACT

The method combines two known types of access: access by pointer and access by variable. These two types of access are made compatible by particular rules of managing the locks: "hold", "read lock", and "write lock". Application to software platforms, in particular those used for telecommunications systems.

1 Claim, 4 Drawing Sheets

METHOD OF MANAGING A SHARED MEMORY USING READ AND WRITE LOCKS

BACKGROUND OF THE INVENTION

The invention relates to managing data in a shared memory, which memory is the main memory of a computer in which a plurality of processes are executed simultaneously. Each process is itself generally made up of a plurality of elementary tasks which can be in competition to access data so as to read it or to modify it. Such a management method is implemented by software referred to as a "data manager". A computer includes a main memory which has limited capacity but in which all of the locations are accessible directly, and therefore very quickly, and a mass memory generally constituted by a hard disk having much larger capacity but offering much slower access because it is necessary to select a track, and then to wait for the desired location on a track to come to a position facing a read head. Conventionally, the operating system of the computer loads only that data which is actually necessary at a given instant into the main memory, and loading is performed via a specialized and fast small memory which is referred to as a cache memory, and which gives the impression of accelerating access to the hard disk, by means of an anticipation mechanism which uses the fact that data is generally used sequentially by applications. Conventional data managers have thus been optimized by taking into account that the data passes through a cache memory.

Progress made in semiconductor memory technology now makes it possible to provide a main memory having sufficient capacity to receive all of the data shared by all of the processes executed in a computer, even for applications handling large volumes of data. The hard disk then serves merely to back up the data by keeping an updated replica of all of the data in the main memory. Loading all of the data in the main memory is particularly advantageous for applications which do not use the data sequentially, a cache memory bringing only a small amount of benefit to such applications. This applies particularly to applications controlling telecommunications exchanges. It is therefore necessary to design data managers that are optimized to manage data entirely loaded in a main memory.

Data managers used in object-oriented data bases are known, as are data managers used in relational data bases.

There are two types of access to data: read access and write access. For each type of access, two transfer modes are known for transferring information between the data manager and an elementary task: a transfer mode by value and a transfer mode by pointer.

For read accessing or write accessing the value of a variable, the transfer mode by value consists in reading or writing a value of the variable in the memory location that contains the current value of the variable; whereas the transfer mode by pointer consists in supplying an address, referred to as a "pointer" to the task that requested the reading or writing, the pointer designating the memory location in which the value to be read is situated or the memory location in which a value is to be written, the task then being free to read or to write in this location so long as it possesses the pointer. When a task accesses a variable in the mode by pointer, it is known that a lock referred to as a "hold" can be allocated to the memory location that contains the current value of said variable, for said task, so as to maintain the consistency of the data seen by each task. The hold is an exclusive right of access to the current value of said variable, so long as the hold is not released.

Transfer mode by pointer is known in object-oriented data managers. It offers the advantage of making fast access possible. It enables data to be handled as a variable of a programming language. But object data managers suffer from the drawback either of not offering multi-task transactions (there is therefore no competition), or of not offering locking at an object (any competition results in a page being locked and causes the page to be copied in full into a log. This level of granularity thus gives rise to increased cost).

The transfer mode by value can be used without managing access competition. Access competition is managed by a "transactional" protocol which is applied by the data manager of the base.

A set of read operations and/or of write operations relating to a plurality of variables and requested by a task in the same request is referred to as a "transaction". In a transaction, each operation may be performed either with the transfer mode by value or with the transfer mode by pointer. Any transaction can be broken down into three stages:

An opening stage during which the data manager supplies a single transaction identifier to the task that has opened the transaction, which identifier designates a memory location containing a descriptor of the transaction.

An access stage during which the read operations or the write operations are executed by the task that has opened the transaction, but remain invisible for users other than this transaction; and during which rights called read locks and write locks are allocated to the transaction, for the memory location in question. In one known access method, when a transaction performs write access, it temporarily enters the new value of the variable in a memory location referred to as a "log" and allocated to the transaction for said variable. This log can be accessed only by said transaction.

A closing or validation stage during which the writing and reading is validated. In the above-mentioned known method, the new values (which are contained in the logs allocated to the transaction) are entered in the locations containing the respective current values, and they become visible to all of the tasks. The values to be read are actually read.

A lock can be allocated to the memory location containing the current value or the new value of a variable so as to prevent other operations which might jeopardize the consistency of the data. A lock can be allocated to an entire table of data. There are two types of lock:

A read lock allocated to a given transaction for a given memory location is a non-exclusive right allocated to the transaction, authorizing said transaction to read the value stored in the memory location and preventing any other transaction that wishes to write in the memory location from being validated.

A write lock allocated to a given transaction for a given memory location is an exclusive write allocated to the transaction, authorizing said transaction and only said transaction to write a value in the memory location.

In certain systems, priority may be allocated to a variable to give priority to one type of operation (reading or writing) over the other type, when two transactions are competing to perform two different operations on the variable. The transaction that requests the higher-priority operation is said to be the "priority" transaction for said variable.

A read lock or a write lock can be either abortable or non-abortable:

If it is abortable, it is released when a transaction that is competing with the transaction possessing the abortable lock has priority thereover. The transaction possessing the lock is then aborted.

If it is non-abortable, it is not released when a transaction that is competing with the transaction possessing the abortable lock has priority thereover. The transaction possessing the lock is not aborted.

An abortable lock goes to the non-abortable state when that transaction that possesses it is validated. Simultaneously, the abortable locks of the competing transactions are released, and the competing transactions are aborted.

Certain transactional protocols make it possible to perform a transaction while guaranteeing four properties referred to as "ACID":

- atomicity (all of the accesses requested by a transaction are processed or none of them are);
- consistency (all of the data goes from one stable state to another stable state);
- isolation (the new values of the variable are not visible outside the transaction, before the transaction is closed);
- durability (as soon as a transaction is validated, the new values of the variables withstand failure of the station on which they are stored, since said new values are backed up on a disk or on another station in working order); and
- serialization (if a plurality of transactions take place in parallel, their results are the same as if they were to take place successively).

Patent Application FR 2 727 222 describes such a transactional protocol. Known data managers guarantee the "ACID" properties but they suffer from the drawback of not offering access by pointer. The prior art thus offers no method that is entirely satisfactory.

SUMMARY OF THE INVENTION

An object of the invention is to provide a method of managing data in a shared memory that procures, on average, very fast access to the data by offering access by pointer, and that nevertheless guarantees the "ACID" properties during a transaction.

The invention provides a method of managing data in a shared memory, data contained in the memory being shared by various competing processes, each process generally being constituted by a plurality of competing tasks; said method being characterized in that:

not within a transaction, for each variable to be read, a read operation consists in:
   allocating a lock referred to as a "hold" to the variable to be read, which hold prevents any access to said variable, if there is not already a hold allocated to said variable; or in allocating a new hold to said variable, after waiting for the preceding hold to be released, if a preceding hold was allocated to said variable; and
   consists either in supplying a pointer designating a memory zone containing the current value of said variable to the process that requested said read operation; or else in supplying the current value of the variable and in copying it in atomic manner into a memory location that belongs to the task that requested said read operation; and then in releasing the hold; and for each variable to be written, a write operation consists in the following steps:
   if there is a hold allocated to the current value of the variable, waiting for the hold to be released; and
   if there is not or is no longer a hold allocated to the variable, allocating a hold to the variable for the time required to write the variable, and:
      if there is a write lock, releasing the hold, waiting for the write lock to be released, and then allocating a new hold to the variable; and
      if there is not or is no longer a write lock, and:
         if there is a read lock, waiting for it to be released if the task that requested said read operation has priority over any writer task, or, otherwise, releasing the read lock and aborting the transaction to which it belongs; and
         if there is not or is no longer a read lock, allocating a non-abortable write lock preventing any other writing; and
   consists either in supplying a pointer designating a memory zone containing the current value of the variable to the task that requested said read operation; or else in supplying a new value for each variable to write, then in copying the new value into said log, then in releasing the non-abortable write lock, and finally in releasing said hold; and within a transaction, for each variable to be read, a read operation consists in performing the following steps:
   if there is no log allocated to the variable for the transaction:
      if there is a hold allocated to the variable, waiting for the hold to be released; and
      if there is not or is no longer a hold allocated to the variable, allocating a hold to the variable for the time required to read the variable;
         if there is no non-abortable write lock allocated to the variable, allocating an abortable read lock to the variable; this abortable read lock preventing any writing not within a transaction, if the reader task has priority over any writer task, and said abortable read lock being released otherwise; and
         if there is a write lock allocated to the variable, releasing the hold and waiting for the non-abortable write lock to be released, and then repeating the preceding operations; and
   consists either in supplying a pointer for each variable to be read to the task that requested said read operation, which pointer designates the log containing the value of the variable; or in supplying the value of the variable and in copying it in atomic manner into a memory zone that belongs to a process that requested said read operation; and then releasing the hold;
   if there is a log allocated to the variable for this transaction:
      if there is a hold allocated to the variable, waiting for the hold to be released; and
      if there is not or is no longer a hold allocated to the variable, allocating a hold to the variable for the time required to read said variable; and
   consists either in supplying a pointer for the variable to be read to the task that requested said read operation, which pointer designates a memory zone containing the value of said variable; or in supplying a value read from the log and in copying it in atomic manner into a memory zone that belongs to a process that requested the read operation; and then in releasing the hold;

for each variable to write, a write operation consists in the following steps:

if there is no log for this transaction:
  if there is a hold allocated to the value of said variable, waiting for the hold to be released; and
  if there is not or is no longer a hold allocated to the current value of the variable, allocating a hold to the current value of the variable for the time required to write a new value, and then:
    if there is a write lock, releasing the hold, waiting for the write lock to be released, then allocating a new hold;
    if there is not or is no longer a write lock, allocating an abortable write lock preventing any other writing, the lock being released if the transaction is aborted; and allocating a log to the variable, then allocating a hold to said log; writing the current value of the variable in the log; and releasing the first hold previously allocated to the current value of the variable; and consists either in supplying a pointer for each variable to be written, which pointer designates the log, or in copying the new value into the log, and then in releasing the hold;

if a log exists for this transaction:
  if there is a hold allocated to the log containing the new value of the variable, waiting for the hold to be released; and
  if there is not or is no longer a hold allocated to the log containing the new value of the variable, allocating a hold to said log; and consists then either in supplying a pointer designating the log; or in supplying a new value for each variable to be written, and in copying the new value into the log, then in releasing the hold.

The method characterized in this way procures, on average, faster access to data because it makes it possible to access a variable by means of a pointer, while enabling competition to be managed if it is possible for the variable to concern a plurality of tasks. The rules given above resolve the conflict existing when two different tasks request respectively a read access and a write access, or two write accesses, for the same variable.

The method characterized in this way offers the advantage of providing atomicity for an access: either by means of a hold if the access is by pointer, or by means of a read lock or of a write lock if the access is by value.

The method characterized in this way thus guarantees the four properties desired for transactions (atomicity, consistency, isolation, and durability) because the hold provides atomicity, the locks provide consistency, the log provides isolation, and the protocol for validating modification of each value provides durability.

BRIEF DESCRIPTION OF THE DRAWING

The invention is better understood, and other details appear from the following description of an example of a data manager of the invention given with reference to the accompanying drawings, in which.

DETAILED DESCRIPTION OF THE INVENTION

The following table summarizes the rules applicable, in accordance with the invention, in the event of competition between two transactions: a first lock already having been allocated to a first transaction, a second lock being about to be allocated to a second transaction, for the same variable; and the table indicating whether the allocation of the second lock is possible (YES) or is refused (NO).

TABLE ONE

| POSSIBILITY OF ALLOCATING THE SECOND LOCK | | FIRST LOCK | | | |
|---|---|---|---|---|---|
| | | Read lock abortable | Read lock non-abortable | Write lock abortable | Write lock non-abortable |
| SECOND LOCK | Read lock abortable | YES | YES | YES | NO |
| | Read lock non-abortable | YES | YES | YES | NO |
| | Write lock abortable | YES | YES | NO | NO |
| | Write lock non-abortable | NO | NO | NO | NO |

On closing a transaction, the conflicts between a first lock allocated to a first transaction and a second lock allocated to a second transaction are resolved as a function of the respective priorities of the two transactions, which priorities are predetermined for each variable. There are two distinct ways of implementing the method, depending on the rule that is set for the case when an abortable write lock is transformed into a non-abortable write lock.

The following table summarizes the possibilities of transforming the second lock in an implementation of the invention.

TABLE TWO

| POSSIBILITY OF TRANSFORMING THE SECOND LOCK | | Read lock abortable | Read lock non-abortable | Write lock abortable |
|---|---|---|---|---|
| SECOND LOCK | Write lock abortable → non-abortable | YES | YES | YES |
| | Write lock abortable → non-abortable | - If priority to the writer: abort first lock and its transaction - If priority to the reader: transformation impossible | Regardless of priority: transformation impossible | Case impossible |

FIGS. 1 to 4 show how a data manager operates that corresponds to this implementation of the method of the invention.

Figure 1:
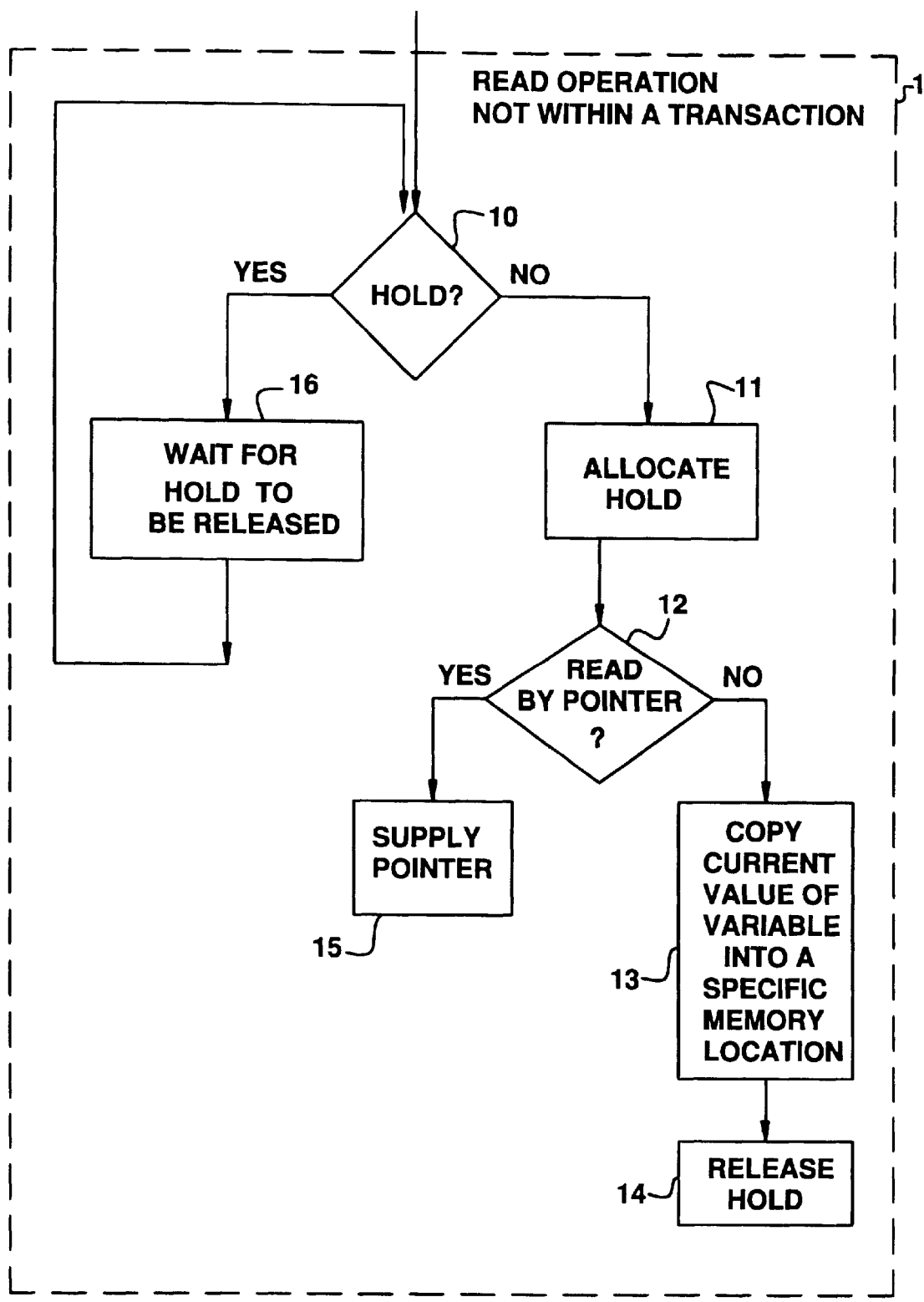
FIG. 1 is a flow chart of the steps involved in reading not within a transaction.

FIG. 1 shows the succession of steps 1 performed by the data manager for reading not within a transaction. Reading a variable by value or by pointer is performed not within a transaction when the task that requests the reading does not request any other accesses in the same request.

Firstly, the data manager performs a step 10 which consists in testing whether a hold exists allocated to a task for this variable:

if a hold exists, a step 16 consists in waiting for the hold allocated to the variable to be released; and if a hold allocated to said variable does not exist or non longer exists, a step 11 consists in allocating a hold to said variable; since this hold prevents any access by the other tasks, it guarantees that the data is not modified by another task; then a step 12 consists in testing whether the reading is a reading by pointer:

if the reading is by pointer, a step 15 consists in supplying a pointer designating a memory location containing the current value of the variable to the task that requested the read operation; and if the reading is not by pointer, but is rather a reading by value, a step 13 consists in copying the current value of the variable, in atomic manner, into a memory location that is specific to the task that requested the reading; and finally a step 14 consists in releasing the hold allocated by step 11.

Figure 2:
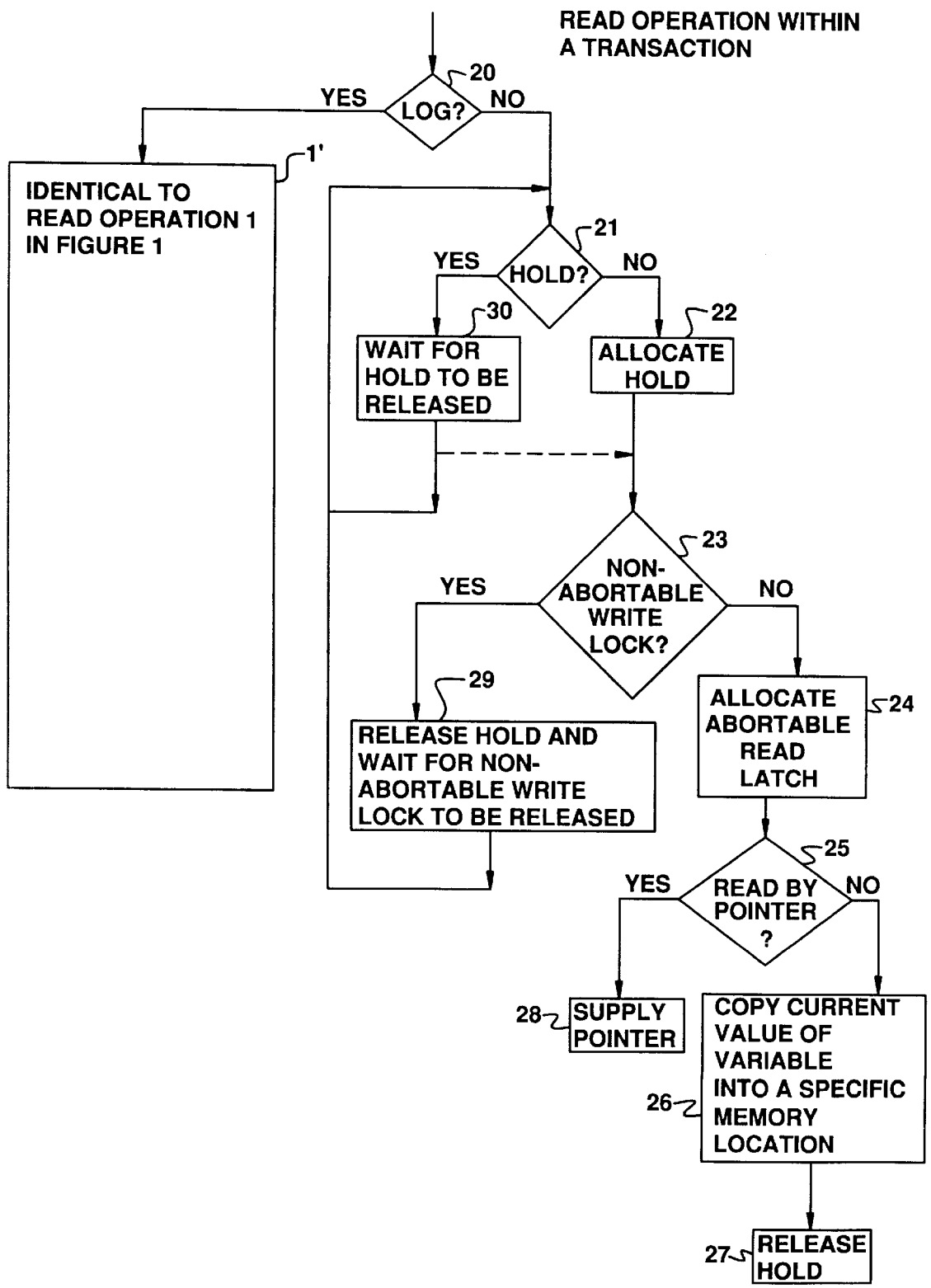
FIG. 2 is a flow chart of the steps involved in reading within a transaction.

FIG. 2 is a flow chart of the steps performed by the data manager for reading within a transaction. Reading a variable by value or by pointer is performed within a transaction when the task that requests the reading requests other accesses in the same request.

A step 20 consists firstly in testing whether a log exists allocated to the variable for temporarily storing a new value of said variable:

if such a log exists, the data manager performs a succession of steps l that is identical to the succession of steps 1 described above with reference to FIG. 1, for reading not within a transaction; and if no log exists allocated to the variable, a step 21 consists in testing whether a hold exists allocated to the current value of the variable:

if there is a hold allocated to the current value of the variable, a step 30 consists in waiting for the hold to be released; and if a hold allocated to the current value of said variable does not exist or no longer exists, a step 22 consists in allocating a hold to the current value of said variable, for the time required to read the variable; since this hold prevents any access by the other tasks, it guarantees the atomicity of the operation; then a step 23 consists in testing whether a non-abortable write lock exists allocated to the current value of the variable:

if there is a non-abortable write lock allocated to the current value of the variable, a step 29 consists in releasing the hold and in waiting for the non-abortable write lock to be released, because setting a write lock is not compatible with the existence of a non-abortable write lock (see Table One, left column); then in starting steps 21, 22, 23, and possibly 30 again; and if there is no non-abortable write lock, there may nevertheless be an abortable write lock, and a step 24 consists in allocating an abortable read lock to the current value of the variable, on condition that the task that requested the reading has priority over any competing writer tasks (as indicated in Table One, allocating an abortable or a non-abortable write lock is possible when an abortable write lock already exists); and a step 25 consists in determining whether the reading is a reading by pointer or a reading by value:

if it is a reading by pointer, a step 28 consists in supplying a pointer for the variable to be read to the task that requested the read operation, the pointer designating a memory location containing the current value of said variable; and if it is a reading by value, a step 26 consists in supplying the current value of the variable, and in copying it in atomic manner into a memory location specific to the task that requested the read operation; and finally in releasing the hold.

Figure 3:
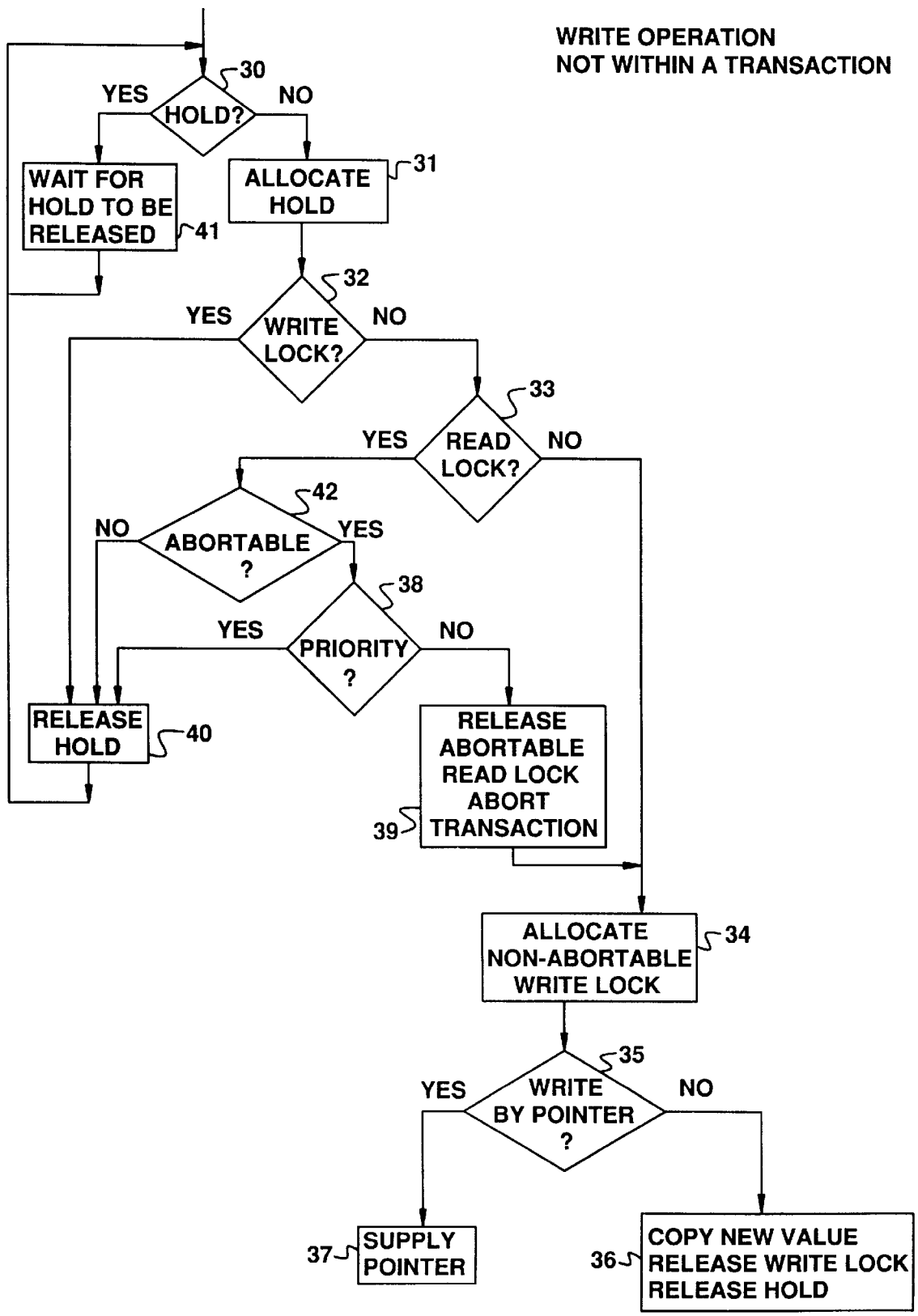
FIG. 3 is a flow chart of the steps involved in writing not within a transaction.

FIG. 3 shows the steps performed by the data manager for a write operation not within a transaction. Writing a variable by value or by pointer is performed not within a transaction when the task that requests the writing does not request other accesses in the same request.

A step 30 consists firstly in testing whether a hold exists allocated to the variable:

if there is a hold, a step 41 consists in waiting for the hold to be released, and then in starting step 30 again; and if a hold does not exist or no longer exists, a step 31 consists in allocating a hold to said variable; then a step 32 consists in determining whether an abortable or a non-abortable write lock exists allocated to said variable:

if there is a write lock, a step 40 consists in releasing the hold allocated by step 31, then in waiting for the write lock to be released, while reiterating steps 30, 31, 32, and possibly 41; and if a write lock does not exist or no longer exists, a step 33 consists in determining whether there is an abortable or a non-abortable read lock:

if there is no read lock, a step 34 consists in allocating a non-abortable write lock to said variable, which lock prevents any writing or reading by others; then a step 35 consists in determining whether the writing is writing by value, or writing by pointer:

if it is writing by value, a succession of steps 36 consists in copying the new value, which is in a memory location belonging to the task that requested the writing operation, into the memory location allocated to the variable, then in releasing the write lock, and then in releasing the hold; and if the writing is writing by pointer, a step 37 consists in supplying a pointer designating a memory zone containing the current value of the variable to the task that requested the write operation, which task can then enter a new value in this location; and if there is at least one read lock, a step 42 tests whether or not the lock is abortable:

if it is an abortable read lock, i.e. if there is at least one competing reader task, a step 38 consists in determining whether at least one competing reader task has priority over any other reader task (to apply the rules situated in the second row of Table Two):

if at least one competing task has priority over any write task, step 40 is performed (withdrawing the hold and waiting for the read lock to be released); and if no competing reader task has priority, a succession of steps 39 consists in releasing each abortable read lock allocated to a competing task, and in aborting the transaction to which the read lock belongs (in compliance with Table Two); then step 34 is performed (a non-abortable write lock is set); and if the read lock is not abortable, step 40 is performed.

Figure 4:
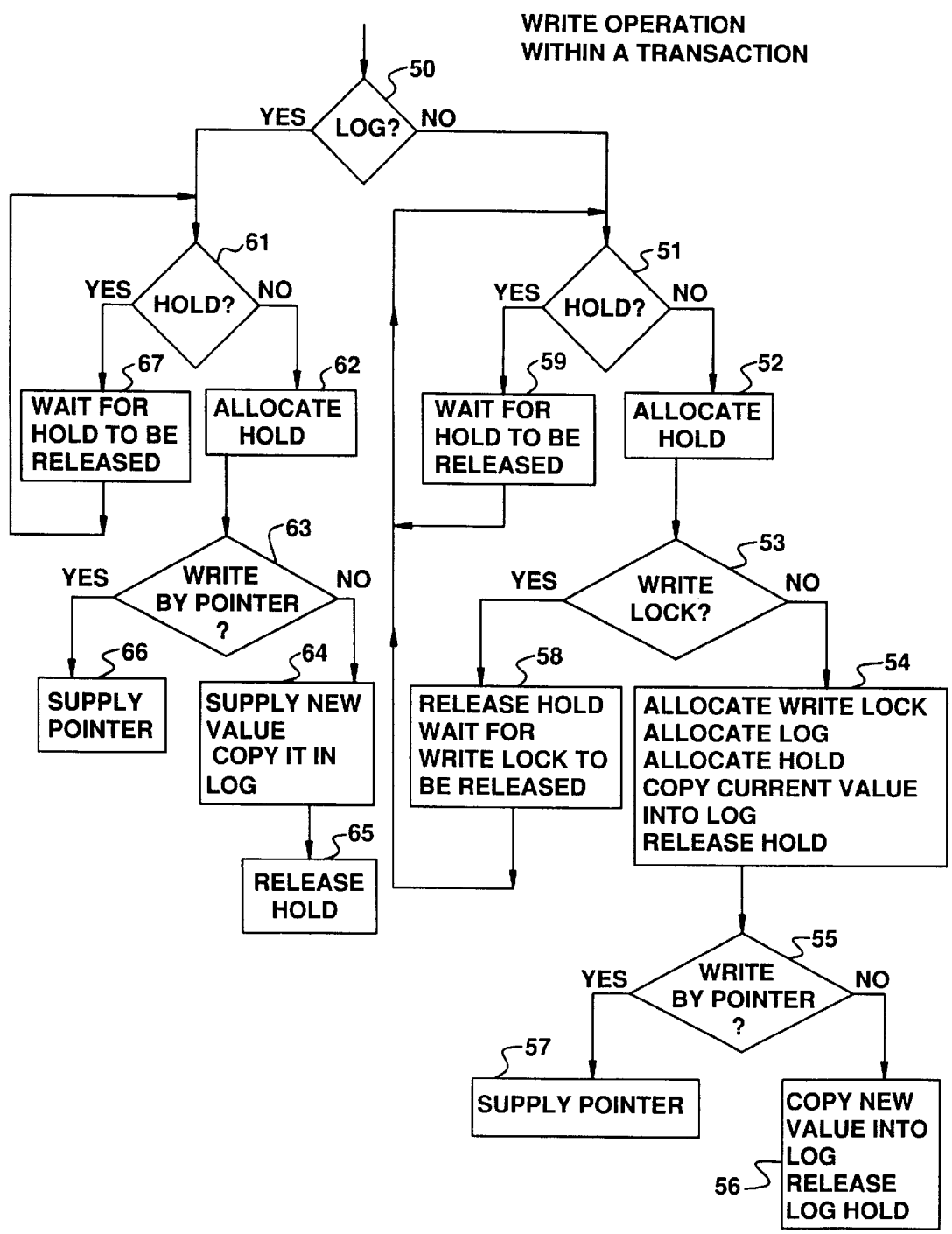
FIG. 4 is a flow chart of the steps involved in writing within a transaction.

FIG. 4 is a flow chart of the steps performed by the data manager for writing within a transaction. Writing a variable by value or by pointer is performed within a transaction when the task that requests the writing requests other accesses in the same request.

A first step 50 consists in determining whether a log exists allocated to the variable in question, for the writer transaction in question:

if such a log does not exist, a step 51 consists in determining whether a hold exists allocated to the current value of the variable:

if a hold does not exist or no longer exists, a step 52 consists in allocating a hold to the current value of the variable; this hold making the operation atomic; then in performing a step 53 consisting in determining whether a write lock exists allocated to the variable:

if there is no write lock, a succession of steps 54 consists in allocating a write lock that is abortable (if the transaction in question is in competition with another transaction) to the current value of the variable for the transaction in question (the rules of Table One permit it); then in allocating a log to this current value, in allocating a hold to the log, which hold makes copying the current value of the variable into the log atomic; then in copying the current value of the variable into the log; then in releasing the hold allocated to the current value; and finally a step 55 determines whether the write operation is a write operation by pointer or by value:

if it is a write operation by value, a succession of steps 56 consists in copying the new value of the variable into the log, then in releasing the hold allocated to the log; and if it is a write operation by pointer, a step 57 consists in supplying a pointer designating the log to the writer task, which pointer enables it to write a new value in the log; then the new value is transferred to the memory location of the current value once the transaction has been validated; and if an abortable or a non-abortable write lock already exists allocated to the current value of the variable, a step 58 consists in releasing the hold and in waiting for the write lock to be released, and then in starting step 51 again; and if step 51 determines that a hold exists allocated to the current value of the variable, a step 59 consists in waiting for the hold to be withdrawn, by starting step 51 again; and if step 50 determines that a log exists allocated to the variable for the transaction in question, a step 61 consists in determining whether a hold exists allocated to said log:

if a hold exists allocated to said log, a step 67 consists in waiting for the hold to be withdrawn by reiterating operation 61; and if no hold exists allocated to said log, a step 62 consists in allocating a hold to the log, which hold prevents any access to the log; then a step 63 consists in determining whether the writing operation is by pointer or by value:

if it is a write operation by value, a succession of steps 64 consists in supplying a new value for the variable, and in copying the new value in the log, and then in releasing the hold; and if it is a write operation by pointer, a step 66 consists in supplying a pointer designating the log to the writer task so that said task can write a new value therein.

We claim:

1. A method of managing a shared memory, wherein data contained in the memory is shared by various competing processes, each process generally being constituted by a plurality of competing tasks; said method comprising:

(A) performing read operations outside of a transaction, wherein, for each variable to be read, a read operation comprises:

(i) if there is a hold allocated to the variable to be read, which hold prevents access to said variable, waiting (16) for the hold to be released;

(ii) allocating (11) a hold to the variable to be read; and (iii) supplying (15) a pointer designating a memory zone containing the current value of said variable to the process that requested said read operation; or else supplying (13) the current value of the variable and copying it in an atomic manner into a memory location that belongs to the task that requested said read operation; and (iv) releasing the hold; and (B) performing write operations outside of a transaction, wherein for each variable to be written, a write operation comprises:

(i) if there is a hold allocated to the current value of the variable, waiting (41) for the hold to be released; and (ii) if there is not a hold allocated to the variable, allocating (31) a hold to the variable for the time required to write the variable, and (iii) if there is a write lock, releasing (40) the hold, waiting for the write lock to be released, and then allocating a new hold to the variable;

(iv) if there is no write lock and there is a read lock, waiting (40) for said read lock to be released if the task that requested said read operation has priority over any writer task, or, otherwise, releasing (39) the read lock and aborting the transaction to which it belongs; and (v) if there is no write lock and there is not a read lock, allocating (34) a non-abortable write lock preventing any other writing; and (vi) supplying (37) a pointer designating a memory zone containing the current value of the variable zone containing the current value of the variable to the task that requested said read operation; or supplying (36) a new value for each variable to write, copying the new value into a log, releasing the non-abortable write lock, and releasing said hold; and (C) performing read operations within a transaction, wherein, for each variable to be read, a read operation comprises:

(i) if there is a log allocated to the variable for the transaction performing a read operation in accordance with steps (A)(i)–(A)(iv);

(ii) if there is no log allocated to the variable for the transaction, performing a read operation in accordance with the following steps (a)–(e):
 (a) if there is a hold allocated to the variable, waiting (30) for the hold to be released; and
 (b) if there is not a hold allocated to the variable, allocating (22) a hold to the variable for the time required to read the variable;
 (c) if there is a non-abortable write lock allocated to the variable, releasing (29) the hold and waiting for the non-abortable write lock to be released, and then repeating the preceding steps (a) and (b); and
 (d) if there is no non-abortable write lock allocated to the variable, allocating (24) an abortable read lock to the variable; said abortable read lock preventing any writing not within a transaction if the reader task has priority over any writer task, and said abortable read lock being released otherwise; and
 (e) supplying (28) a pointer for each variable to be read to the task that requested said read operation, wherein the pointer designates the log containing the value of the variable; or supplying (26) the value of the variable and copying it in an atomic manner into a memory zone that belongs to a process that requested said read operation; and then releasing (27) the hold;

(D) performing read operations within a transaction, wherein for each variable to write, a write operation comprises:
 (i) if there is no log for said transaction, performing a write operation in accordance with the following steps (a–d):
  (a) if there is a hold allocated to the value of said variable, waiting (59) for the hold to be released; and if there is not a hold allocated to the current value of the variable, allocating (52) a hold to the current value of the variable for the time required to write a new value; and
  (b) if there is a write lock, releasing (58) the hold, and returning to the preceding step (a);
  (c) if there is not a write lock, allocating (54) an abortable write lock preventing any other writing, the lock being released if the transaction is aborted; allocating (54) a log to the variable, allocating (54) a second hold to said log; writing (54) the current value of the variable in the log; and releasing (54) the first hold previously allocated to the current value of the variable; and
  (d) supplying (57) a pointer for each variable to be written, which pointer designates the log, or copying (56) the new value into the log, and then releasing the hold;
 (ii) if a log exists for this transaction, performing a write operation in accordance with the following steps (a)–(b):
  (a) if there is a hold allocated to the log containing the new value of the variable, waiting (67) for the hold to be released; and if there is not a hold allocated to the log containing the new value of the variable, allocating (62) a hold to said log; and
  (b) supplying (66) a pointer designating the log; or supplying (64) a new value for each variable to be written, copying the new value into the log, and then releasing (65) the hold.

* * * * *